Hyer and Hudson.
Seeder & Cultivator.
N° 86,307. Patented Jan. 26, 1869.
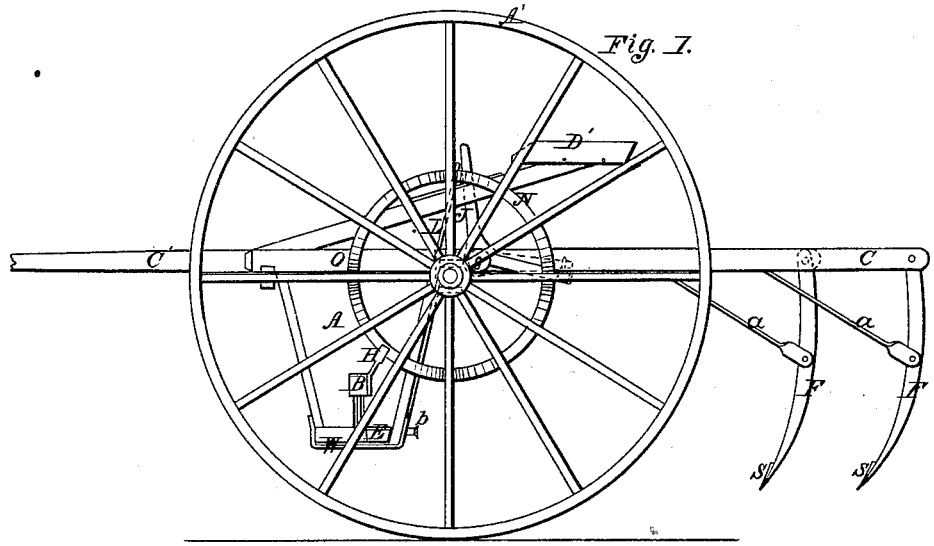
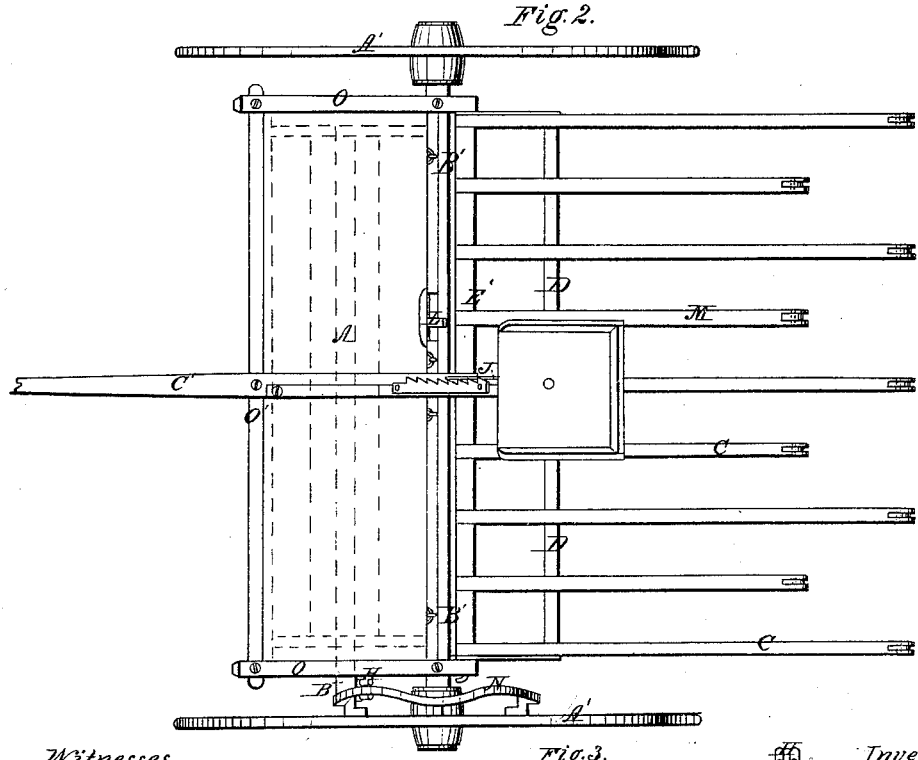
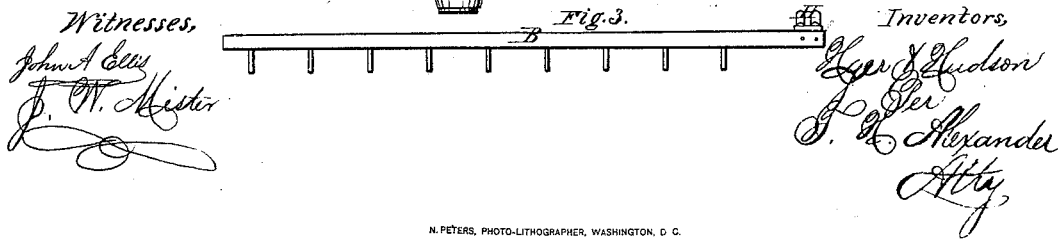
Witnesses,
John A Ellis
J. W. Mister
Inventors,
Hyer & Hudson
per
J. L. Alexander
Atty.

C. M. HYER AND J. C. HUDSON, OF IOWA FALLS, IOWA.

Letters Patent No. 86,307, dated January 26, 1869.

IMPROVEMENT IN COMBINED SEED-SOWER AND CULTIVATOR.

The Schedule referred to in these Letters Patent and making part of the same.

*To all whom it may concern:*

Be it known that we, C. M. HYER and J. C. HUDSON, of Iowa Falls, in the county of Hardin, and State of Iowa, have invented certain new and useful Improvements in Combined Seeder and Cultivator; and we do hereby declare that the following is a full, clear, and exact description thereof, reference being had to the accompanying drawings, and to the letters of reference marked thereon, which form a part of this specification, and in which—

Figure 1 is a perspective view, and the rest of the figures represent different parts of the cultivator, which will be hereinafter referred to.

The nature of our invention consists in the construction and general arrangement of a seeder and cultivator, which can be used as a corn-plow and cultivator.

In order to enable others skilled in the art to make and use our invention, we will now proceed to describe its constuction and operation.

A' A' represent wheels, secured to the ends of the axle B', which are made in any of the known and usual ways, and of any dimensions desired.

Near the ends of the axle B', inside of the wheels, bars O O are secured, the rear ends of which extend only a short distance in rear of the axle, and the front ends extend a suitable distance forward, and are at these ends connected by a bar, O', forming a frame, across the centre of which the tongue C' is placed, said tongue being at its rear end firmly secured to the axle.

In this frame the seed-box A is placed.

The sides of this box are slanting, making the bottom narrower than the top, and in the entire length of the bottom is an opening, which can be closed or opened at will by means of a bar, E, which runs alongside of said opening, and is connected to the bottom by bent wire hinges.

A lever, L, is pivoted on the rear side of the seed-box A, and is connected, by means of a rod, K, to the said bar E, so that the operator, from his seat, at D', can easily open or close the opening through which the seed is discharged.

Through the box A, just above the bottom, is a bar, B, which is on its under side provided with a series of pins, which, when said bar is moved back and forth, prevent the seed from clogging, and assist in distributing the same.

The bar B is kept in motion, back and forth, by means of a cam-wheel, N, placed on the inner side of one of the driving-wheels, and which works between two lugs or pins, H, provided with friction-rollers on one end of said bar.

Through the rear ends of the bars O O, immediately in rear of the axle, passes a shaft, E', on which a series of long and short cultivator-bars, C C and M M, are pivoted. These bars are placed alternately, one long and short, but so arranged that a long one is at each end, and their rear ends are rounded, and provided with holes, through which passes the shaft E'.

Their rear ends are slotted or forked, and in these ends the shanks F F are pivoted, and to the lower ends of said shanks the plows S S are secured.

The shanks are held in proper position by means of braces *a a*, which are made of band-iron or other suitable material, one end being fastened to the under side of the cultivator-bars, and the other ends being split and bent up, forming a fork, which are secured to about the centre of the shanks.

A bar, D, is placed under the bars C C and M M, and end-pieces to said bar are pivoted on the ends of the shaft E'.

A bent lever, J, is pivoted on the centre of said shaft, one end of which lever is secured to the bar D, and the other extends upward within reach of the operator. By the means of this lever, all the plows can at the same time be raised out of the ground, and held up, while turning or passing from one field to another, the lever being placed in the notches on a ratchet-bar, which is secured to the beam or bar supporting the seat D'. By this means the depth to which the plows enter the ground can also be regulated.

By removing the seed-box A, the machine is easily transformed into a corn-plow.

When used as a seeder, the discharge of the seed is regulated by a thumb-screw, *b*, in the side of the box A, which thumb-screw operates on the movable bar E, making the opening in the bottom of the box larger or smaller, as may be desired.

Having thus fully described our invention,

What we claim as new, and desire to secure by Letters Patent, is—

The bar E, to which an oblique and lateral motion is given, as described, for the delivery of the seed, when regulated by means of a thumb-screw, substantially as herein set forth.

In testimony that we claim the foregoing as our own, we affix our signatures, in presence of two witnesses.

C. M. HYER.
J. C. HUDSON.

Witnesses:
O. W. GARRISON,
JAMES RIGG.